March 20, 1951 D. E. BRIDGES 2,545,567

SELECTIVE CIRCUIT ARRANGEMENT

Filed Aug. 6, 1947 5 Sheets-Sheet 1

D. E. Bridges
*Inventor*

By [signature]
*Attorney*

March 20, 1951 D. E. BRIDGES 2,545,567

SELECTIVE CIRCUIT ARRANGEMENT

Filed Aug. 6, 1947 5 Sheets-Sheet 2

D. E. Bridges
*Inventor*

By [signature]

*Attorney*

March 20, 1951 D. E. BRIDGES 2,545,567

SELECTIVE CIRCUIT ARRANGEMENT

Filed Aug. 6, 1947 5 Sheets-Sheet 3

D. E. Bridges
*Inventor*

By [signature]
*Attorney*

March 20, 1951 D. E. BRIDGES 2,545,567

SELECTIVE CIRCUIT ARRANGEMENT

Filed Aug. 6, 1947 5 Sheets-Sheet 4

D. E. Bridges
Inventor

By

Attorney

March 20, 1951 D. E. BRIDGES 2,545,567

SELECTIVE CIRCUIT ARRANGEMENT

Filed Aug. 6, 1947 5 Sheets-Sheet 5

D. E. Bridges
*Inventor*

By Nelson Moore
*Attorney*

Patented Mar. 20, 1951

2,545,567

UNITED STATES PATENT OFFICE 2,545,567

SELECTIVE CIRCUIT ARRANGEMENT

Donald Edward Bridges, London, England

Application August 6, 1947, Serial No. 766,605
In Great Britain April 9, 1945

Section 1, Public Law 690, August 8, 1946
Patent expires April 9, 1965

10 Claims. (Cl. 250—27)

The present invention relates to selective circuit arrangements and is more particularly concerned with circuit arrangements adapted to discriminate between signals on the basis of signal recurrence frequency.

Intelligence may be conveyed by, for instance, amplitude modulation of a carrier wave and multi-channel operation may be effected by employing carrier waves of different frequencies in conjunction with filter circuits which discriminate between the different carrier frequencies. Intelligence may, however, also be transmitted by pulse modulation of a carrier wave in which case multi-channel operation may be obtained by employing different pulse recurrence frequencies. Filter circuits are again necessary but in this case the discrimination is between waves of different pulse recurrence frequencies.

It is an object of the present invention to provide an improved circuit arrangement which will give a sharp response to a pulse modulated carrier wave having a desired pulse recurrence frequency.

According to the invention, the circuit includes a switching device which is adapted to be closed automatically at a recurrence frequency which is less than the desired frequency until a pulse signal is received when the recurrence frequency of the switching device is increased to the desired frequency and maintained at that frequency if the input signal is of the desired frequency or is increased and subsequently reverts to the lower value if the pulse signal has a frequency other than the desired frequency. As applied to the switching device, the words "closed" and "open" have the same meaning as when applied to a switch, namely that a signal passes through the switch when the switch is "closed" but not when it is "open."

According to a feature of the invention, the circuit includes a switching device which is adapted to be closed and opened automatically, the period during which the device is opened being preset while the period during which it is closed is variable between two limiting valves of which the maximum occurs in the absence of pulse signals while the minimum occurs on the reception of pulse signals of the desired recurrence frequency.

According to another feature of the invention the circuit includes a switching device which is adapted to be closed automatically for a predetermined period at regular intervals in the absence of pulse signals and to be opened by the arrival of a pulse during said predetermined period, the arrangement being such that if the pulse signal is of the desired recurrence frequency the subsequent closing of the switch takes place at the desired recurrence frequency to enable a response to the pulse signal to be obtained.

According to a further feature of the invention the circuit includes a switching device which is adapted to be closed at a recurrence frequency which is less than the desired recurrence frequency, the effect of a pulse arriving while the switching device is closed being to cause the switching device to be opened substantially without delay so that the next closing of the switching device is advanced in time and if the pulse signal is of the desired recurrence frequency, the recurrence frequency of the switching device is thus increased to the desired value to enable the signal to be received.

Preferably the switching device consists of a thermionic valve, the pulse signals being applied to one control electrode while a switching signal is applied to a second control electrode, the arrangement being such that the pulse signals are without effect unless occurring at a time when a switching signal is applied to the second control electrode. For example the thermionic valve may be a pentode, when the pulse signals will be applied to the control grid while the switching signal will be applied to the suppressor grid, response to the signal being obtained from the anode circuit. It will be understood that, assuming the pulse and switching signals are both positive-going, a response will only be obtained in the anode circuit if the pulse signal occurs while a switching signal is applied to the suppressor grid. A circuit which includes a thermionic valve operated in this manner is termed a "gate" circuit and the valve is termed a "gate" valve.

The switching signal may be generated by employing a plurality of delay circuits arranged in series and operated successively, the switching signal being obtained from a convenient point in the series connection. One of the delay circuits is variable and is under the control of the output of the switching device so that on the reception of an input signal while the switching device is closed, the operation of the variable delay circuit is terminated and the next delay circuit is set in operation. Preferably the delay circuits include a thermionic valve and are of the type having a feed back condenser connected between two electrodes, for instance, the anode and control grid.

The invention will be better understood from the following description of one embodiment taken in conjunction with the accompanying drawings in which—

Figure 4:
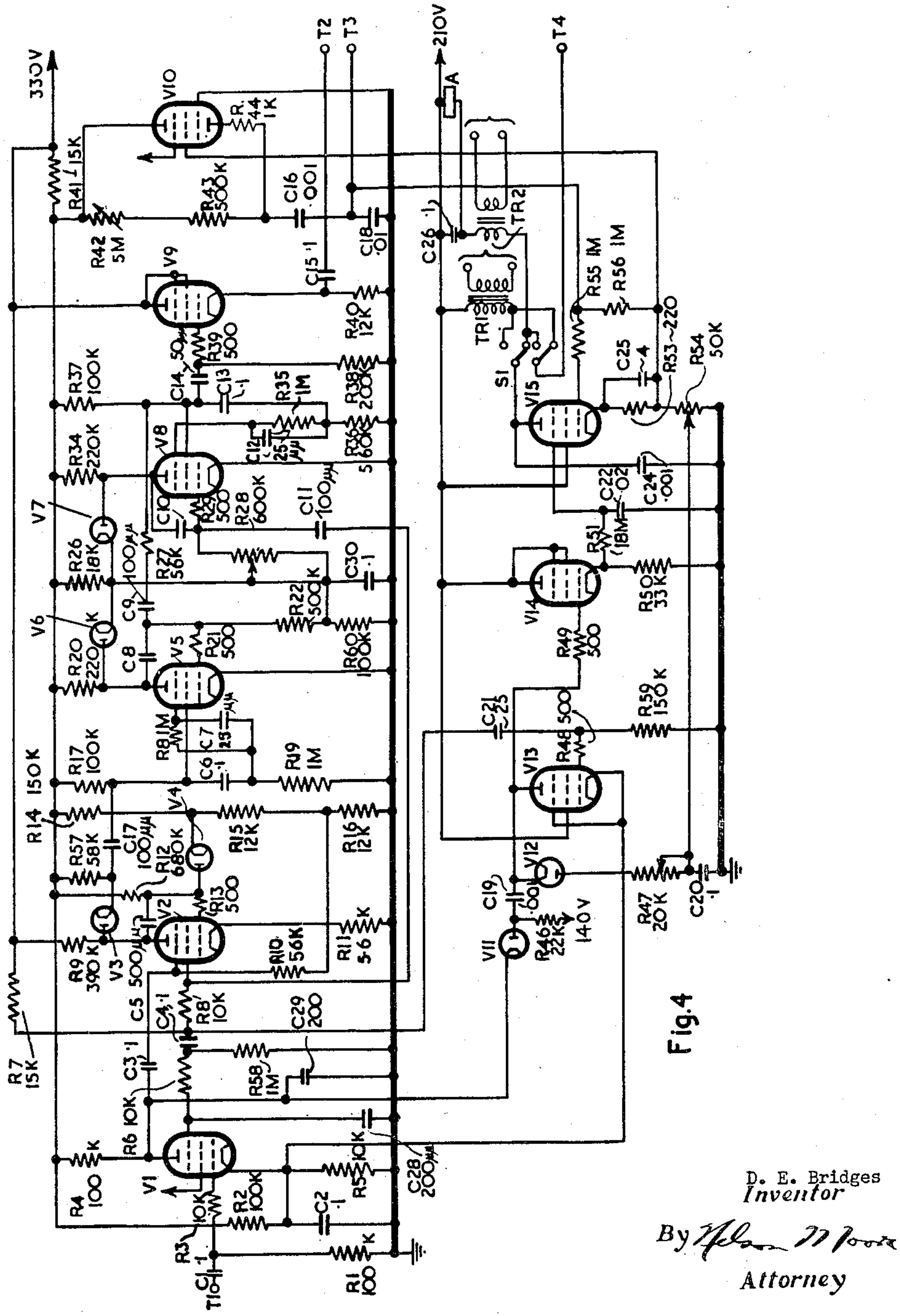
Fig. 4 shows the circuit of the filter.
Figure 5:
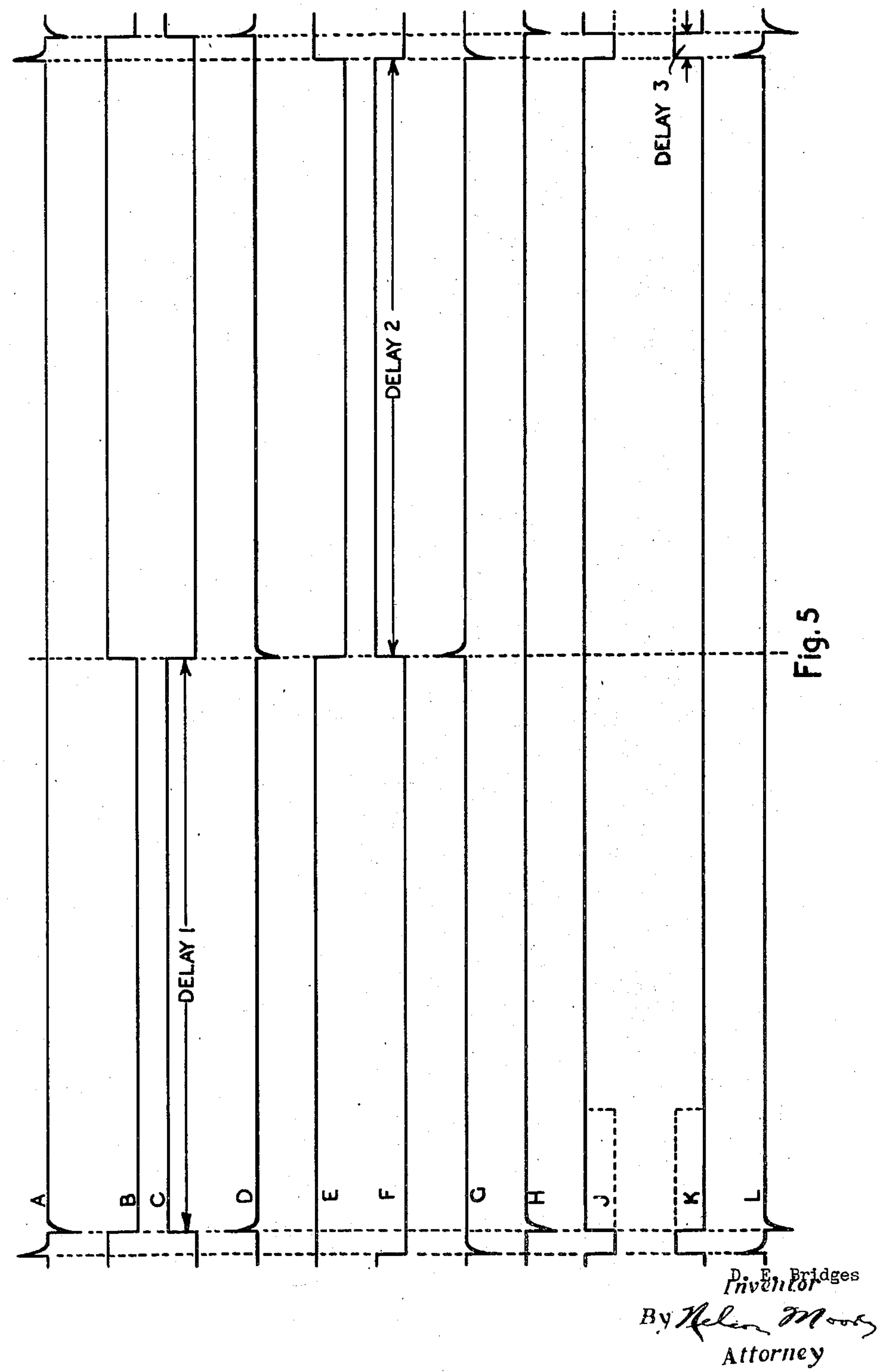
Figs. 5 and 6 show idealised waveforms developed at various points in the circuit of Fig. 4.
Figure 6:
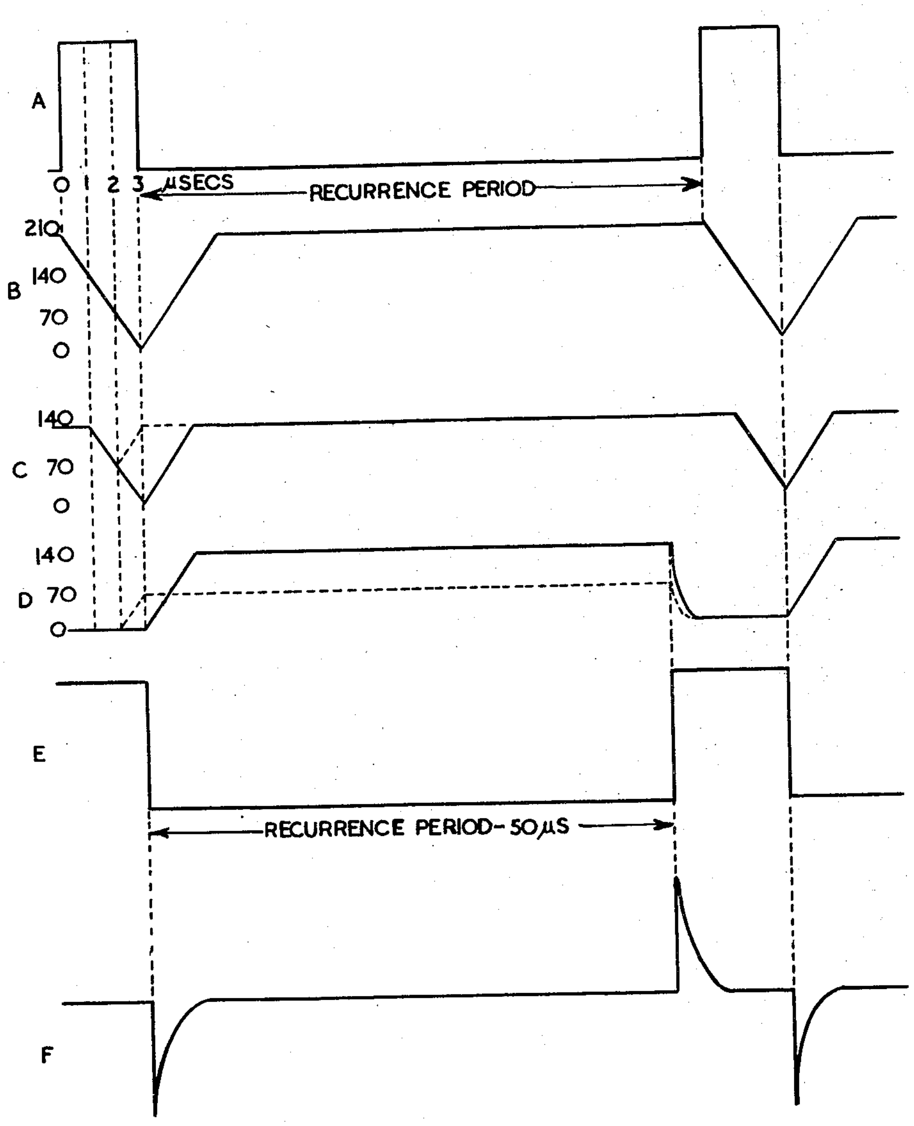

It will be noted that, in the circuit diagram of Fig. 4, the values of the components and the types of valves employed are shown and also in the description which follows particular voltage and current values are given. These values are given purely by way of example and the invention is not to be considered in any way limited thereto. Further the waveforms given in Figs. 5 and 6 are ideal waveforms and do not necessarily represent the waveforms which would be obtained under test conditions.

Figure 1:
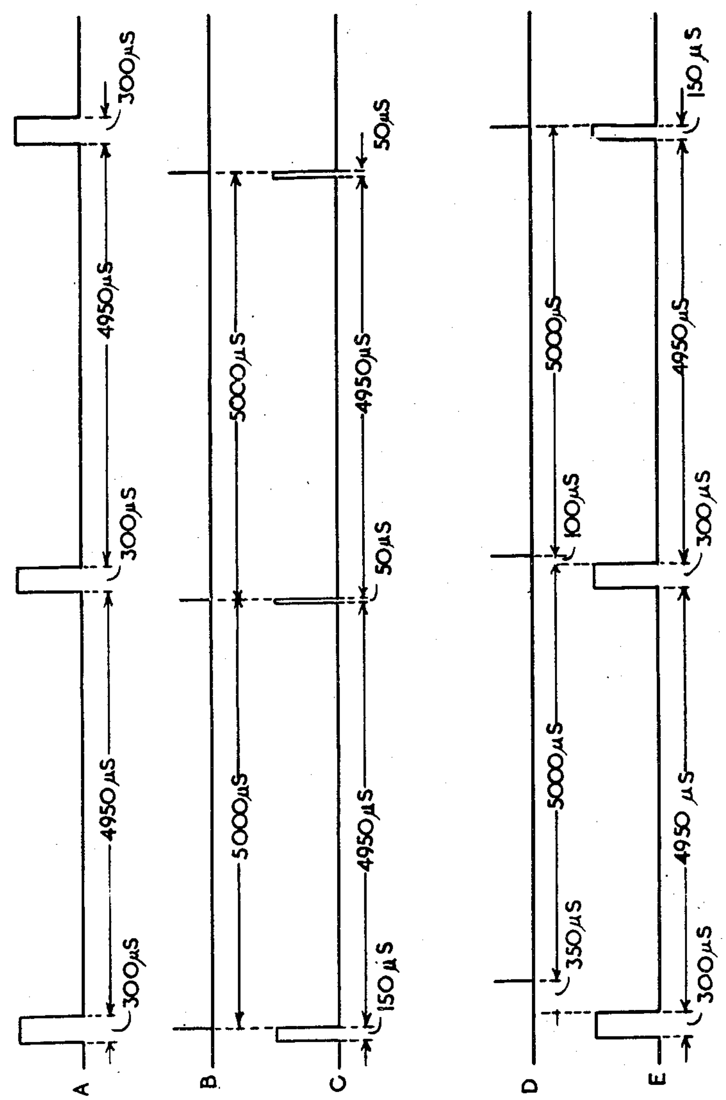
Fig. 1 shows in diagrammatic form the principle underlying the invention.
Figure 2:
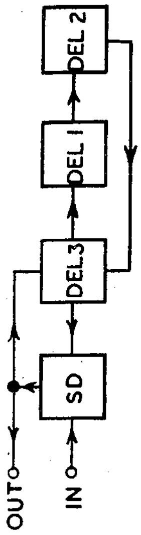
Fig. 2 shows a simplified block schematic diagram.

A description of the principles underlying the invention will first be given with reference to Figs. 1 and 2. As shown in the simplified block schematic diagram of Fig. 2, three delay circuits are employed, Del. 1, Del. 2 and Del. 3. These delay circuits may be of the same general type as those disclosed in patent application Serial No. 762,375 filed July 21, 1947 by Frederic C. Williams for an invention entitled Electronic Relay Circuit Arrangement, and are arranged to operate in series, that is to say Del. 1 is triggered and, at the end of its delay period, it triggers Del. 2 which at the end of its delay period triggers Del. 3. Similarly Del. 3 at the end of its delay period triggers Del. 1 and the whole process is repeated. The delays introduced by Del. 1 and Del. 2 are fixed and substantially equal while the delay introduced by Del. 3 is variable. A square waveform obtained from Del. 3 is employed as the switching signal which is fed to the switching device SD. The input signal is also fed to the switching device SD through terminal In and the output from the switching device is fed to Del. 3. The output from the filter is also obtained from SD via terminal Out. Since the recovery time of the delay circuits such as Del. 1 and Del. 2 is appreciable, the use of two circuits is necessary.

In order to understand the operation of the filter reference will be made to Fig. 1 which illustrates the operation in the case of a particular example. It has been assumed that the desired pulse recurrence frequency is 200 per second, giving a recurrence period of 5000 microseconds. The sum of the delays introduced by Del. 1 and Del. 2 is then fixed at 4950 microseconds and, in the absence of any input signal, the delay introduced by Del. 3 is 300 microseconds. The switching signal thus has the waveform shown in Fig. 1A, in the absence of an input signal. It will be seen that in this condition the recurrence frequency of the switching signal is less than the desired recurrence frequency.

Now suppose that input signals having the desired recurrence frequency are applied to the switching device and that one signal arrives when the switching device has been closed for 150 microseconds (Fig. 1B). The effect of this input signal is to terminate the delay of Del. 3, and hence the switching signal, substantially immediately (Fig. 1C). The fixed delay of 4950 microseconds now begins 150 microseconds earlier so that the next switching signal will occur 50 microseconds before the next input pulse. This input pulse will terminate the switching signal and the whole sequence is again repeated. Thus on the reception of input signals having the desired recurrence frequency, the duration of the switching signal is reduced to 50 micro-seconds, and the circuit may be said to be "locked" to the input signals.

It is, of course, possible that the first input pulse arrives at a time when the switching pulse is not effective. As shown in Figs. 1D and E, the first input pulse occurs 350 microseconds after the termination of the switching signal. Since, however, at this time the recurrence period of the switching signal is less than the desired recurrence period, the next input pulse will be closer to the termination of the switching signal, e. g. it will occur 100 microseconds from the termination of the switching signal in the example given. Finally the third input pulse will occur when the switching signal has been in existence for 150 microseconds and thereafter the timing will be the same as shown in Fig. 1C.

The time lost if the first input pulse arrives when the switching device is open is comparatively small. The worst time for a pulse to arrive is just before the switching device closes and in the example considered the switching signal overtakes the input signals at the rate of 250 microseconds every cycle so that the time which elapses before an input pulse coincides with a switching signal is $$\frac{4950}{250}\times\frac{1}{200}\text{ secs.}=.099\text{ second}$$

or approximately $\frac{1}{10}$ second.

It will be understood that in the absence of input signals of the desired recurrence frequency, input signals of adjacent frequencies may lock the circuit. Thus if P is the recurrence period of the desired pulse recurrence frequency, input signals having recurrence periods between approximately P−50 microseconds and P+250 may lock the circuit. Where P is 5000 microseconds i. e. pulse recurrence frequency of 200 cycles per second, the frequency band of input signals which will lock the circuit is approximately 191 to 201.5 cycles per second. Where P is 10,000 microseconds, i. e. a pulse recurrence frequency of 100 cycles per second, the frequency band extends from approximately 97 cycles per second to 100.5 cycles per second. In the practical embodiment described subsequently, the pulse recurrence frequency is close to 100 cycles per second and with the frequency limits given above it will be appreciated that it is possible to select the pulse recurrence frequencies for multi-channel working so that substantially no interference occurs while at the same time the frequency band occupied by the signals is not excessively wide. It will, of course, be understood that the liability of a filter circuit to interference is greater when it is not receiving input signals of the desired pulse recurrence frequency since then the switching signal has a width of 300 microseconds.

It is, of course, possible that an occasional unwanted signal is received during the switching period even when the circuit is locked to an input signal of the desired recurrence frequency. For example, suppose an unwanted input signal is received 25 microseconds after the commencement of the switching signal. The switching signal is terminated substantially immediately and the wanted signal is lost. However the circuit is self-compensating in this respect since, provided no unwanted pulse occurs during the next switching period, the wanted signal will occur 75 microseconds after the commencement of the switching signal instead of the usual 50 microseconds.

It will be appreciated from the above description of the principles underlying the invention that the switching signal performs a searching operation which continues until an input signal is received. If the input signal is not of the desired pulse recurrence frequency and is not within the limits as defined above, it will be rejected or will lock the filter circuit only for a short period. However, if the signal is of the desired recurrence frequency, the filter circuit will lock to the signal after a short period and will remain locked to it as long as the input signals are being received.

A description will now be given of the particular embodiment of the invention with reference to the block schematic diagram of Fig. 3 and the detailed circuit diagram of Fig. 4.

Figure 3:
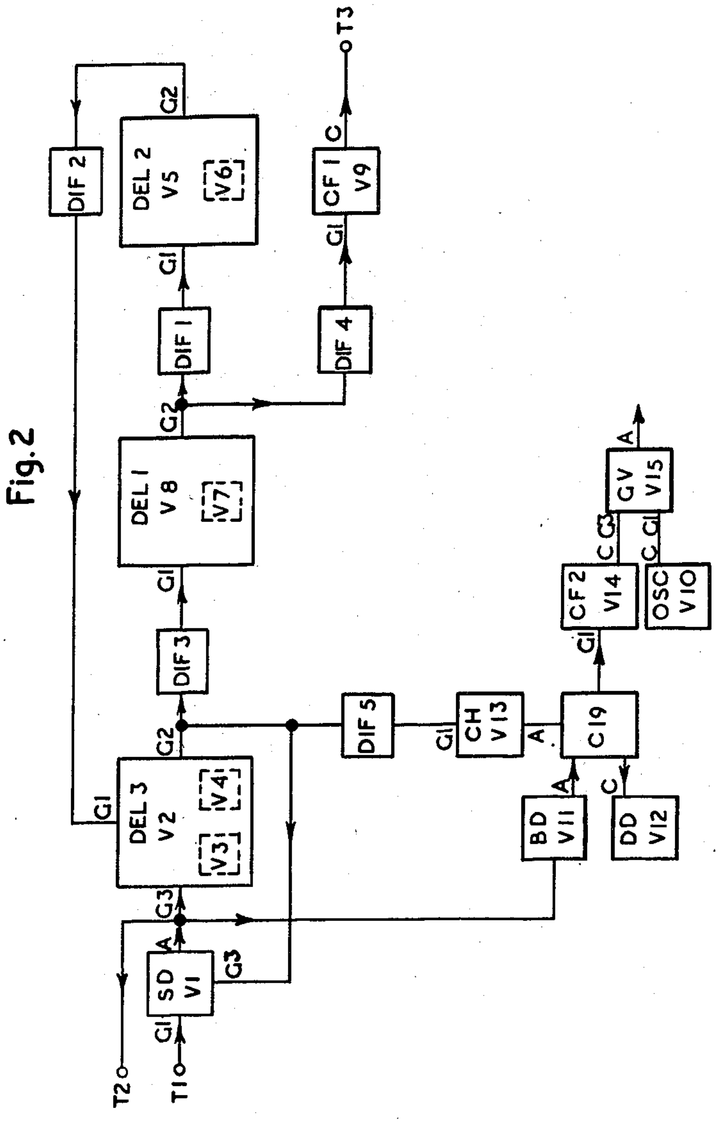
Fig. 3 shows a block schematic diagram of the circuit employed

Referring to Fig. 3, the switching device SD consists of a pentode valve V1 to the control grid of which are applied the input signals while the switching signals are applied to the suppressor grid. These switching signals are obtained from the output of the delay circuit Del. 3. The voltage developed in the anode circuit of V1 is fed to the demodulator via a blocking diode BD and to the suppressor grid of the valve V2, which forms part of the delay circuit Del. 3, in order to terminate the switching signal.

The delay network Del. 3 consists of a pentode valve V2 and two diodes V3 and V4 arranged in a circuit of the type disclosed in copending United States application Serial No. 762,375 filed July 21, 1947 by Frederic C. Williams for an invention entitled Electronic Relay Circuit Arrangement. The circuit has a natural delay period of 300 microseconds but is arranged, as described in detail subsequently, so that the delay may be terminated at any time after a duration of 50 microseconds by a negative-going pulse of suitable amplitude applied to the suppressor grid. The circuit is triggered by a negative going pulse applied to the anode (Del. 3) or to the control grid (Del. 1 and Del. 2), and a positive-going square wave is obtained from the screen grid. The delay circuits Del. 1 and Del. 2 are similar to Del. 3 in that the operation is due to the provision of a feed-back condenser between the anode and control grid. In Del. 3, however, the action is also dependent on the provision of an undecoupled cathode resistance so that the cathode potential follows that of the control grid while in Del. 1 and Del. 2, the screen and suppressor grids are coupled together so that the suppressor grid voltage follows that of the screen grid. The delay circuit Del. 1 consists of a pentode valve V8 and a diode V7 while Del. 2 similarly consists of pentode valve V5 and diode V6. The waveforms obtained from, and the triggering of Del. 1 and Del. 2 are similar to Del. 3.

The circuit operates in the following manner. Suppose a triggering pulse is applied to the control grid of V8. This will be negative-going such as shown in Fig. 5A and will cause a positive-going voltage waveform (Fig. 5C) to be obtained from the screen of V8, the duration of the waveform being determined by the constants of the circuit. This waveform is differentiated by the circuit Dif. 1 and the negative-going peak (Fig. 5D) triggers the delay circuit Del. 2. A positive-going square waveform is again obtained from the screen grid of V5 (Fig. 5F) and the sum of the durations of the two screen grid waveforms is made equal to the recurrence period less 50 microseconds. The screen grid waveform from V5 is differentiated by the circuit Dif. 2 and the negative peaks (Fig. 5G) are employed to trigger the delay circuit Del. 3. The positive-going square waveform obtained at the screen of V2 has a natural duration of 300 microseconds but may be terminated earlier by the negative-going anode waveform of V1 (Fig. 5H) as described previously. In Fig. 5K, the minimum duration of the waveform (50 microseconds) is shown in full lines while the maximum duration is shown in dotted lines. This screen waveform from V2 is differentiated by Dif. 3 and the negative-going peaks are employed to trigger Del. 1 and the whole sequence is repeated.

The waveform obtained from the screen of V8 (Fig. 5C) is also differentiated by Dif. 4 and the positive-going peaks (Fig. 5D) which are synchronous with the input signal are fed through the cathode follower CF1 and terminal T3 to provide a 20 microsecond pulse which is applied to a gate valve (not shown) 4 microseconds before the transmitter trigger pulse arrives at the valve, this trigger pulse being delayed by 4 microseconds in the receiver. This delay is necessary since a common transmitting and receiving aerial system is employed. By the use of the gate valve it is ensured that the transmitter is triggered only by input signals of the desired pulse recurrence frequency.

As pointed out previously, the voltage waveform at the anode of V1 is fed to the demodulator via a blocking diode BD. The demodulator operates in the following manner. A condenser C19 is charged in the absence of input signals and is discharged through a discharge diode DD by an input signal, the amount by which it is discharged being directly proportional to the width of the input signal. The maximum and minimum pulse widths referred to above are 3 and 1 microseconds respectively and the purpose of the blocking diode BD is to prevent discharge of the condenser when the pulse width has its minimum value. Above this value, the condenser will be partially or completely discharged and a corresponding D. C. potential will be fed through the cathode follower CF2 to the suppressor grid of a gate valve V15 to the grid of which is applied a 1000 cycle per second tone from the oscillator V10. When the steady D. C. potential is zero, the anode circuit of V15 has no A. C. component i. e. the percentage modulation is 100 while as the D. C. potential rises the percentage modulation decreases to a minimum of zero with a 3-microsecond pulse width. The condenser is charged in readiness for the next input signal at the commencement of a switching signal by the output from the screen grid of V2 (Del. 3). This output is differentiated by Dif. 5 and the positive peaks (Fig. 5L) are applied to the control grid of the charging valve V13 (CH) the anode of which is connected to C19. Current flows through the valve into the condenser until it is again charged.

A detailed description will now be given of the circuit diagram shown in Fig. 4. The variable-width positive-going input signal is applied through receiving equipment (not shown)

to terminal T1 and thence via C1 and R3 to the control grid of V1, the gate valve, R1 acting as a grid leak. The valve V1 is of a type such as the British Mazda V872 and has a short suppressor grid base. The cathode of V1 is maintained at about 20 volts by R2 and R5, the condenser C2 acting as a by-pass condenser, while R3 is sufficiently large to prevent V1 from loading the receiver output too much when grid current flows.

The positive-going switching signal or gate pulse is obtained from the junction of R7 and R8 is fed through C4 and R6, with R58 acting as a grid leak, to the suppressor grid of V1. The anode of V1 is fed with 210 volts from 330 volts H. T. via R4 and when an input signal arrives during a switching period, a negative-going pulse (Fig. 5H) is developed in the anode and is fed to the suppressor grid of V2 via the blocking condenser C3. The effect of this pulse is to terminate the gate pulse and hence the negative-going pulse at the anode of V1. In order, however, to enable pulses having a width of 3 microseconds to pass through V1, the resistance R6 and condenser C28 are provided to delay the termination of the gate pulse by a little more than 3 microseconds.

The valve V2, which together with V3 and V4 forms the third delay circuit Del. 3, is also a valve of the Mazda V872 type. The two diodes may conveniently be provided by a double diode, for instance an EB34. As previously mentioned this delay circuit is of the same type as that disclosed in co-pending United States application Serial No. 762,375 filed July 21, 1947 by Frederic C. Williams for an invention entitled Electronic Relay Circuit Arrangement to which reference should be made for a detailed description of its operation. The diode V4 has a normal cathode potential of 30 volts obtained from the potential divider R14, R15 and R16 while the normal suppressor voltage of 15 for V2 is obtained from the same source. Normally, therefore, the anode of V2 is cut off and the space current passes to the screen grid which is connected to 330 volts H. T. The anode voltage tends to rise to 330 but is maintained at 210 volts by the diode V3, the cathode of which is supplied with 210 volts. The circuit is triggered by a negative-going pulse applied to the cathode of V3. The anode voltage of V3 and V2 decreases and this decrease is fed back through C5 to the control grid. The potential of the control grid falls followed by the cathode (Fig. 5J) so that the suppressor grid rises with respect to the cathode. The space current now begins to flow to the anode instead of to the screen and the screen voltage (Fig. 5K) rises while the anode voltage falls, the fall in anode voltage being fed back to the control grid. The control grid and cathode potentials continue to fall until an equilibrium position is reached in which the control grid is almost cut off. This takes place in a very short time so that a sharp positive-going waveform is developed at the screen grid. The diodes V3 and V4 are now both cut off and the control grid potential tends to rise to 210 volts through R12, since there is no grid current flowing. This rise in control grid voltage, however, causes a further fall in anode voltage which, being fed back through C5 to the control grid, opposes the original rise in grid voltage. It can be shown that the anode voltage falls linearly at this time while the control grid and cathode voltages rise slightly. This continues until the anode voltage approaches that of the cathode when the anode voltage becomes constant so that there is no feedback. The control grid voltage rises rapidly towards 210 volts followed by the cathode potential. When the latter becomes 15 volts, the anode is cut off and the space current again flows to the screen. The anode and control grid voltages rise rapidly until V3 and V4 are again conducting while the screen grid voltage falls. The circuit is now in its original condition.

Now the delay circuit Del. 3 must be so arranged that it is capable of terminating the delay at any time even at the beginning of the delay. The termination of the delay is effected by the negative-going pulse at the anode of V1, which negative-going pulse is fed to the suppressor grid of V2. When V2 is triggered, the anode voltage falls by approximately 30 since the cathode, which was originally at 30 volts falls to approximately earth potential. Now the negative-going pulse applied to the suppressor of V2 will momentarily depress the suppressor voltage below that of the cathode and so tend to terminate the delay period but, for this termination to be permanent, the cathode voltage must rise to a value above that of the steady suppressor voltage (15 volts) during the time that the negative-going pulse is applied to the suppressor grid. This means to say that the anode voltage must rise by say, 20 volts during this period. The time-constant which controls the rate of rise of anode voltage is given by the product of R9 in parallel with R12 and C5 and the stray capacities associated with the grid and anode of the valve. By selecting the voltage at which the anode begins to rise and also the voltage to which it tends to rise, the time taken to rise through 20 volts can be suitably adjusted. In the circuit shown, the anode voltage is originally 210, since the cathode of V3 is supplied with 210 volts, so that when the cathode is at earth potential, the anode is at 180 volts. Further the anode voltage tends to rise to 330 and with these values, the anode voltage rises from 180 to 200 in a time which is approximately 1/5 of the time constant which is sufficiently rapid.

It will be noted that the screen grid of V2 is connected to the 330 volts H. T. supply through R7 and R8 while the output to the suppressor of V1 is taken from the junction of these two resistances. The load on the screen grid is split in this manner in order to remove the excess loading from the screen thereby allowing the voltage to rise as rapidly as possible when V2 is triggered. This rapid rise is necessary as the screen pulse (Fig. 5K) is differentiated (Figs. 5L and A) for triggering the valve V8, the first delay valve, and if the input pulse arrives just after the beginning of the switching signal, the screen pulse will be very narrow and unless it rises sufficiently rapidly, the amplitude will be too small to trigger V8.

The two delay circuits Del. 1 and Del. 2 comprising the valves V8 and V5 respectively together with the associated diodes V7 and V6, are very similar. The valves V5 and V8 are both of a type such as the British Mullard EF50 while V6 and V7 may be conveniently provided by a double-diode, for instance, an EB34. The circuits operate on the same principle as the circuit of V2 in that feed back condensers are employed between the anode and grid circuits. As previously mentioned, however, the coupling between the control grid and cathode, which was effected by the uncoupled cathode resistance R11, is omitted and the screen grid and suppressor grid are coupled together by condensers (C13 for V8 and C6 for V5).

The operation of the delay circuit Del. 1 will first be described. Assume that the control grid of V8 is substantially at earth potential (Fig. 5B) and the potential of the suppressor grid is negative with respect to the cathode so that the anode is cut off. The space current will then all flow to the screen so that the screen voltage will be low (Fig. 5C). Now suppose that with the valve in this condition, a negative-going pulse such as is shown in Fig. 5A is applied to the control grid. This cuts off the space current and the screen voltage immediately rises to 210 volts (Fig. 5C). This increase in potential is applied through C13 to the suppressor grid which then becomes positive with respect to the cathode so that when the negative-going pulse on the control grid is terminated and space current again flows, anode current flows also. The anode voltage thus falls and this fall in voltage is fed back to the control grid through C10 to oppose the fall of anode voltage. It can be shown that this fall of anode voltage is linear with time, the voltage of the control grid falling to some substantially constant negative value between earth and the cut off value during this period (Fig. 5B). As the anode voltage falls, the space current will divide, part going to the anode and part to the screen grid. Towards the end of the delay period, more and more of the space current will pass to the screen and the fall in screen voltage will be fed through C13 to the suppressor grid. Eventually the suppressor grid becomes sufficiently negative with respect to the cathode and the anode is suddenly cut off. The whole of the space current now flows to the screen and the screen voltage suddenly falls. When the anode is cut off, the anode potential rises exponentially with a time constant dependent upon C10 and R34. The control grid potential also rises to a value slightly above earth potential at which value it is maintained by grid current flow. This raising of the control grid potential also assists the rapid fall in screen voltage. The valve V8 has now returned to its initial condition and on the arrival of the next triggering pulse the cycle of events is repeated.

It will be seen that if no further triggering pulse arrives, the suppressor grid potential will gradually rise at a rate determined by the time constant C12.R36 so that eventually the suppressor cut-off point will be reached and anode current will again start to flow. The circuit is thus self-running and this is necessary to ensure that the circuit as a whole starts up when the power supplies are first switched on.

The duration of the delay is determined by the values of C10 and R28, the grid leak resistance. Although one condenser only has been shown in the diagram, preferably a number are provided and one is selected, for instance, by means of a switch according to the desired pulse recurrence frequency. Alternatively the appropriately valued condenser may be plugged in by the provision of a suitable socket. The exact timing of the circuit is obtained by adjustment of R28 which, although not so shown, consists of a number of resistances of which only one is adjustable. The remainder is made up partly by high-stability carbon film resistances and partly by wire wound resistances in such proportion that the negative temperature coefficient of the former compensates for the positive temperature coefficient of the latter to provide very high temperature stability.

The resistance R35 in the suppressor grid circuit is a current limiting resistance and the parallel condenser C12 prevents distortion by R35 of the sharp edges of the pulses from the screen. The by pass condenser C30 serves to smooth out any ripple which may be present in the H. T. supplies and which may have some effect on the duration of the delay.

The output of the delay circuit is taken from the screen grid of V8 (Fig. 5C) and consists of a positive-going square wave. This is differentiated by C9 and R22 (Fig. 5D) and applied to the control grid of V5 which forms the delay circuit Del. 2. The negative-going peak triggers V5 in the same way as V8. The resistance R27 is included in the feed circuit from the screen of V8 to prevent the loading of the grid circuit of V5 from destroying the positive edge of the screen waveform. This positive edge is not employed in the delay circuit but it has a function which will be described later.

The circuit of V5 is very similar to that of V8 but they differ in the two following respects. In the first place the suppressor grid leak R19 is 1 megohm instead of 560,000 ohms. This difference in value is necessary to prevent the two valves operating in parallel instead of in series when the filter is first switched on. The other point of difference is that the grid leak resistance R22 of V5 is fixed, the adjustment of the sum of the two delays being effected by R28. The feedback condenser C8 is arranged in a similar manner to that of V8. If banks of condensers are provided in each case, the selecting switches may then consist of two arcs of a single switch. Values for C8 and C10 have not been inserted in the diagram as they will be different for each pulse recurrence frequency. As an example, for a pulse recurrence frequency of 97.5 cycles per second, a suitable value for C8 and C10 is 0.01 microfarad.

The waveforms developed at the grid and screen of V5 are shown in Fig. 5E and F. The screen waveform is differentiated by C17 and R57 (Fig. 5G) and applied to the cathode of V3 to trigger the valve V2 in the manner previously described.

It has previously been mentioned that the operation of the airborne transmitter is controlled by the output of V8 (Fig. 5C). Referring to Fig. 4, this output is differentiated by C14 and R38 and applied through R39 to the control grid of the cathode follower V9 (a valve of the Mullard EF50 type). The positive-going output pulse, having a pulse width of approximately 20 microseconds, is taken from the cathode resistance R40 through the blocking condenser C15 and terminal T2 to the receiver (not shown), where it acts as a gate pulse to enable the delayed pulses to pass through the receiver and trigger the transmitter only if they have the appropriate recurrence frequency.

A description will now be given of the operation of the demodulator which consists of the valves V11 to V15. The two diodes V11 and V12 are both Mullard EA50 type while V13 to V15 are Mullard EF50 type. As previously mentioned the negative-going pulse obtained at the anode of V1 when an input signal occurs during a switching period is fed to the cathode of the blocking diode V11. The anode potential of this diode is 140 volts and the normal potential of the anode of V1 and hence the cathode of the diode is 210 volts so that the diode is cut off. The anode of V1 is connected to earth by the condenser C29, the capacity of which is such that when an input signal is applied to the control grid of V1 during a switching period, the anode voltage of V1 falls at the rate of 70 volts per microsecond. Now it has previously been mentioned that a 1 microsecond input signal is not to be effective on the demodulator and it will be seen that such a signal will cause a fall of 70 volts in the anode potential, reducing it to 140. The diode V11 will therefore not conduct. Suppose however that the pulse width is 3 microseconds (Fig. 6A). The anode voltage of V1 and the cathode voltage of V11 now fall to zero (Fig. 6B), the diode V11 conducts and the condenser C19 is completely discharged. The curves of Fig. 5C and D show the variations in potential of the left hand and right-hand plates respectively of the condenser C19. At the end of the 3 microsecond input signal the voltage of the anode of V1 and the cathode of V11 rise and V11 is cut off. The potential of the left-hand plate of C19 also rises and carries the right-hand plate with it as current cannot flow into the condenser. When the anode voltage of V1 reaches 210, both plates of the condenser C19 are at 140 volts and the condenser is still completely discharged. If the input signal has a duration of 2 microseconds, however, the potential of the left hand plate falls to 70 volts as shown by the dotted line in Fig. 6C and rises to 140 again at the end of the pulse. During this 70 volts rise, it carries the right hand plate with it so that when the anode voltage of V1 is again 210, the left hand plate of C19 is at 140 volts and the right hand plate is at 70 volts. The condenser is thus only partially discharged.

The above described operation has been simplified by the assumption that the rate of fall of voltage at the anode of V1 is constant at 70 volts per micro-second. This is not entirely true as, when V11 conducts, C19 and R47 are in parallel with C29 and the rate of fall of voltage at the anode of V1 is less and is dependent on the setting of R47. The change in the rate of fall of anode voltage is, however, not substantial.

The condenser is maintained partially discharged until the delay circuit Del. 3 is triggered by the delay circuit Del. 2. The resulting positive-going waveform at the screen of V2 is shown in Fig. 5K and in Fig. 6E on a distorted time scale. This waveform is differentiated by C21 and R59 and the resulting peaks (Fig. 6F) are applied to the control grid of V13. The valve V13 is normally cut off and the positive peak, which occurs at the beginning of the switching period, causes current to flow through the valve and into the condenser to charge the condenser fully again. Assuming that the input signals are of the desired recurrence frequency, it will be seen that the condenser will remain charged for the duration of the switching period, i. e., 50 micro-seconds. Hence if the pulse width is greater than 1 micro-second, the condenser C19 is maintained at a potential which, neglecting the short period between the charging and succeeding discharging of the condenser, is constant at a value substantially directly proportional to excess of the input signal pulse width over 1 microsecond.

The condenser potential is applied to the control grid of the cathode follower V14 and the positive-going output from the cathode load R50 is applied to the suppressor grid of V15 through R51. Thus D. C. changes in potential of C19 are applied to the suppressor grid of V15, R51 and C22 serving as a filter for removing the discontinuity in the D. C. potential which exists for the period between the charge and discharge of C19. The time constant of this filter is such that approximately eight pulses of the same width are required before a steady potential is reached on the suppressor grid of V15. This ensures that if an unwanted pulse of different width is received during the 50 microsecond switching period, the D. C. potential on the suppressor grid of V15 does not change appreciably.

The output from a 1000 cycles per second tone generator is applied to the control grid of V15 and it will be understood that the amplitude of the A. C. component of the anode voltage will be directly proportional to the D. C. potential on the suppressor grid of V15. The tone is obtained from a relaxation oscillator consisting of the two lower electrodes of V10, which is a valve of a type such as the British Marconi STV280/40, the resistances R42 and R43 and the condensers C16 and C18. The output is taken from the junction of the C16 and C18 which form a potential divider. The valve V10 also provides a stabilised 140 volt source from the electrode next to the upper electrode.

It will be noted that there are two variable resistances in the demodulator circuit, R47 and R54. The former controls the rate at which the condenser C19 discharges while the latter determines the standing potential on the grid of V14. This potential has been neglected in deriving the waveforms shown in Figs. 6C and D.

The output from V15 is applied via the switch S1 and either transformer TR1 and TR2 to the pilot or navigator respectively of the aircraft according to the position of the switch S1. The output from the valve in the second filter circuit corresponding to V15 is fed to terminal T4, the arrangement being such that tone from one filter circuit passes to the pilot's headphones and tone from the other passes to the navigator's headphones.

It will be understood that the particular embodiment described above is given solely by way of example and the invention is in no way limited thereto. For example the invention is not limited to the use of the particular type of delay circuit shown in Fig. 4 and the circuit of Fig. 4 may be employed singly if desired.

I claim:

1. Apparatus adopted to respond to a pulse signal having a given pulse recurrence frequency comprising in combination, a switching device which passes signals in a closed condition and blocks signals in an open condition, a local generator which produces a switching signal which both opens and closes said switching device at a recurrence frequency which is less than the given recurrence frequency, means for applying pulse signals to said switching device, and means for opening said switching device after a predetermined delay following receipt of a pulse signal during a period when said switching device is closed, the magnitude of said predetermined delay being sufficient to allow the whole of any desired pulse signal to pass through said switching device before it is opened, said local generator comprising a plurality of series-connected delay devices, and means for deriving said switching signal from a desired point in said series of delay devices.

2. Apparatus adopted to respond to a pulse signal having a given pulse recurrence frequency comprising in combination, a switching device which passes signals in a closed condition and blocks signals in an open condition, a local generator which produces a switching signal which both opens and closes said switching device at a recurrence frequency which is less than the given recurrence frequency, means for applying pulse signals to said switching device, and means for opening said switching device after a predetermined delay following receipt of a pulse signal during a period when said switching device is closed, the magnitude of said predetermined delay being sufficient to allow the whole of any desired pulse signal to pass through said switching device before it is opened, said local generator including at least one delay device having a thermionic valve including an anode, a control grid and a screen grid, and a feedback condenser connected between the anode and control grid thereof to produce a square wave output from said screen grid.

3. Apparatus adopted to respond to a pulse signal having a given pulse recurrence frequency comprising in combination, a switching device which passes signals in a closed condition and blocks signals in an open condition, a local generator which produces a switching signal which both opens and closes said switching device at a recurrence frequency which is less than the given recurrence frequency, means for applying pulse signals to said switching device, and means for opening said switching device after a predetermined delay following receipt of a pulse signal during a period when said switching device is closed, the magnitude of said predetermined delay being sufficient to allow the whole of any desired pulse signal to pass through said switching device before it is opened, said local generator including a plurality of series-connected delay devices each comprising a thermionic valve having an anode, a control grid and a screen grid and a feedback condenser between the anode and control grid thereof to produce a square wave output from said screen grid, and means for differentiating the output of at least one delay device and applying the negative-going peak to trigger the succeeding thermionic valve.

4. The invention of claim 1, and means for controlling the delay introduced in accordance with the reception of a pulse signal after the closing of the switching device.

5. The invention of claim 1, in which the switching device consists of a thermionic valve having at least two control electrodes and in which the pulse signal is applied to one control electrode and the switching signal is applied to the other control electrode, both signals being positive-going so that an output is obtained only when the two signals are co-existent.

6. The invention in accordance with claim 1, and circuit arrangements for converting a width modulated pulse signal into an amplitude modulated signal, said arrangements including a condenser, means for varying the charge on said condenser in accordance with the pulse width of a width modulated pulse input signal, means for deriving a direct current potential proportional to the steady voltage developed across said condenser, means for generating a continuous signal, and means for applying said potential to said switching device to control the amplitude of the signal output of said generating means.

7. Apparatus adapted to respond to a pulse signal having a given pulse recurrence frequency comprising in combination, a switching device which passes signals in a closed condition and blocks signals in an open condition, a local generator comprising a plurality of series-connected delay devices arranged to operate continuously in a cyclic manner to produce a switching signal for closing said switching device at the commencement of operation of a predetermined one of said delay devices and for opening said switching device upon the termination of operation of said one of said delay devices, the recurrence frequency of said switching signal being less than the given pulse recurrence frequency in the absence of a pulse signal, means for applying pulse signals to said switching device, and means for terminating the operation of said one delay device within a predetermined period after the receipt of a pulse signal while said one delay device is operating, said predetermined period being of such magnitude as to enable the whole of any desired pulse signal to pass through said switching device.

8. The invention in accordance with claim 7, in which said one delay device comprises a thermionic valve having at least an anode, a control grid and a screen grid, and a feedback condenser connected between said anode and said control grid to produce a square wave output from said screen grid.

9. The invention in accordance with claim 7, in which each of said delay devices comprises a thermionic valve having at least an anode, a control grid and a screen grid, and a feedback condenser connected between said anode and said control grid to produce a square wave output from said screen grid.

10. The invention in accordance with claim 7, in which said switching device comprises a thermionic valve having at least two control electrodes and means for applying the pulse signal to one of said control electrodes and for applying the switching signal to the other of said control electrodes, the magnitudes of said signals being so adjusted that an input is obtained from said switching device only when the two signals are co-existent.

DONALD EDWARD BRIDGES.

REFERENCES CITED

The following references are of record in the file of this patent:

UNITED STATES PATENTS

| Number | Name | Date |
|---|---|---|
| 2,277,000 | Bingley | Mar. 17, 1942 |
| 2,419,570 | Labin et al. | Apr. 29, 1947 |
| 2,425,314 | Hansell | Aug. 12, 1947 |
| 2,425,315 | Atwood et al. | Aug. 12, 1947 |
| 2,433,667 | Hollingsworth | Dec. 30, 1947 |
| 2,462,896 | Ransom | Mar. 1, 1949 |

FOREIGN PATENTS

| Number | Country | Date |
|---|---|---|
| 460,488 | Great Britain | Jan. 28, 1937 |